United States Patent Office 3,330,344
Patented July 11, 1967

3,330,344
SECONDARY RECOVERY METHOD
Joseph Reisberg, Houston, Tex., assignor to Shell Oil Company, New York, N.Y., a corporation of Delaware
No Drawing. Filed Apr. 13, 1964, Ser. No. 359,405
12 Claims. (Cl. 166—9)

This invention relates to a fluid drive process for the recovery of hydrocarbons from oil-bearing reservoir formations. More particularly it pertains to an improved method of flooding such a reservoir with aqueous liquid to effect an effective and efficient secondary or tertiary recovery of oil therefrom.

It is well known that the so-called primary recovery techniques, which include natural flow, gas-lifting, gas-repressurization and pumping techniques, recover only a portion of the oil present in a given oil-bearing earth formation. Even the use of the supplemented primary recovery practices, e.g., use of gas re-pressuring treatments, and the like, still leaves large quantities of oil, some of which may be adhering to the particles of sand or the particles of the oliferous structure, trapped in pores by capillary and hydrodynamic forces, etc.

For this reason there is a great deal of interest in the so-called secondary recovery techniques, the use of which permits the recovery from the partially depleted formation of additional quantities of oil present therein. These secondary recovery techniques, in general, utilize the principle of augmenting the tendency for oil to flow after the natural drive has been depleted during oil recovery by the afore-mentioned primary recovery methods. This reservoir energy augmentation is often effected by providing, e.g., by drilling, one or more injection wells extending downwardly into the oil-bearing reservoir formation within suitable proximity to a producing well or wells which have been drilled into the same formation. A liquid or a gas, or mixtures thereof, is then injected through the above-mentioned injection well to drive the oil to and thus increase the oil production from the producing well or wells.

Water, usually in the form of an aqueous solution containing one or more dissolved salts, is often used to displace the oil within a reservoir. In this general method which is commonly designated by the term 'water-flooding,' an aqueous liquid is pumped through an injection well into the oil-bearing formation to drive the oil from the zone near the point of injection toward a point at which fluid is produced from the formation. Waterflooding is advantageous because the cost of the amount of aqueous liquid required to fill the pore volume of reservoir formation between the points of injection and production is usually significantly less than the value of the oil that is displaced.

Waterflooding is, however, subject to various disadvantages. Most oil-bearing reservoirs comprise porous rocks in which the pores contain at least three, oleaginous, aqueous, and solid, immiscible phases and often contain a fourth, gas, immiscible phase. The boundary tensions between these immiscible phases seriously reduces the efficiency of a waterflood by causing a high degree of entrapment due to capillary pressures within the pores of the reservoir formation. In addition, the aqueous fluid tends to bypass or "finger through" the oil and leave a significant amount with the reservoir. The fingering tendency is enhanced by the fact that most aqueous liquids have viscosities that are considerably less than those of the reservoir oils. Thus, to some extent, the recoveries obtainable by waterflooding can be improved by the incorporation of viscosity increasing material into at least the frontal portions of the aqueous drive liquid.

It is known that the displacement efficiency of a waterflood can be improved by injecting a slug of a liquid that is miscible with both oil and water ahead of the aqueous drive liquid and keeping it between the oil and water phases. However, such oil and water miscible materials are relatively very expensive and it is seldom possible to recover and reuse enough to adequately reduce the chemical cost of such an operation.

Alternatively, the displacement efficiency of a waterflood can be improved by incorporating a surfactant into the system. Various procedures have heretofore been employed, such as incorporating a surfactant into an oil miscible liquid injected ahead of the aqueous drive liquid, or forming a surfactant across the oil-water interface. However, in the procedures heretofore employed, any improved drive efficiency that is initially obtained tends to be lost as the drive progresses. A surfactant containing system is most efficient when a certain concentration of the surfactant is present in a particular electrolyte. In practical waterflooding operations, the criticality of the concentrations used is increased by the economic necessity of using a minimum amount of the relatively expensive surface active material. As the drive progresses, the concentration at which the surfactant is present in the frontal portion of the aqueous phase is reduced by the adsorption of the surfactant onto the rocks. In addition, the amount of the reduction in the interfacial tension that is produced by the aqueous solutions or suspensions of surfactants that have heretofore been used in insufficient to reduce the capillary pressure within the pores of the reservoir formation to an extent permitting an efficient displacement of the oil. Although the loss of surfactant by adsorption onto the rocks can be minimized if the electrolyte concentration, or the nature of the surfactant, is such that the surfactant is preferentially dissolved in the oil phase, it is generally necessary to flow many pore volumes of the aqueous fluid through the reservoir formation in order to displace the oil. The oil is moved in small increments as small volumes of oil are emulsified and/or entrained by each of the many volumes of aqueous liquid that are moved through a given zone of the reservoir.

It is therefore an object of this invention to avoid the above and other defects of the prior art, and to provide an efficient and economical waterflood method or technique.

It is a further object to provide a waterflooding operation in which at least the frontal portion of an aqueous drive liquid is an unique aqueous liquid that is miscible with both a significant proportion of the reservoir oil and is composed of relatively low cost ingredients that can be left unrecovered within the reservoir formation without destroying the economic advantages of the waterflooding operation.

It is a further object to provide a process of forcing oil to flow within a permeable earth formation by a miscible displacement with an aqueous liquid that contains a surfactant and an amphiphilic coupling agent in proportions such that the aqueous liquid exhibits a close resemblance to a single phase liquid that is misible with both oil and water.

It is a further object to provide a process of displacing the oil within a reservoir formation with an oil-solubilizing aqueous liquid which, if it is forced to finger through and move past a portion of the oil, solubilizes the oil and, in effect, dissolves it in the next portions that contact the oil.

It is a further object to provide a process of fractionally extracting selected crude oil compounds from the oil contained within an oil-bearing reservoir formation, by flowing a selectively effective oil-solubilizing aqueous liquid through the reservoir and recovering the solubilized components of the oil from that liquid.

Many of the above and other objects and advantages of the present invention can be attained by injecting an aqueous liquid drive fluid into an oil-bearing reservoir formation to displace oil toward a point at which fluid is produced from the reservoir formation and maintaining in said aqueous liquid, in at least the frontal portion, an oil-solubilizing aqueous solution of surfactant micelles that are combined with molecules of an amphiphilic organic compound of low water solubility.

The characteristics that identify an aqueous solution of surfactant micelles, and the methods by which such solutions are formed, are amply described in the chemical literature relating to colloids. In general, the concentration curves of surfactant solutions in aqueous liquids are known to exhibit striking breaks or inflections when plotted against various physical properties such as surface and interfacial tension, osmotic pressure, electrical conductance, and detergency. This region of inflection represents a concentration above which free molecules or ions of the surfactant associate to form highly organized, oriented colloidal aggregates, or "micelles" that are dissolved in the aqueous liquid. This concentration is termed, the "critical concentration for micelle formation" (abbreviated CMC).

In the present process an aqueous solution of surfactant micelles, i.e., an aqueous solution of a surfactant at a concentration above the CMC, is mixed with sufficient amphiphilic material of low water solubility to liquefy the interfacial films of the micelles. This appears to cause the palisade layer of each micelle to be penetrated by molecules of the amphiphile. It produces a solution of swollen micelles that contain, or are combined with, molecules of an amphiphilic coupling agent. Such a solution is sometimes referred to as a micro-emulsion. The swollen micelles are capable of incorporating either oil or water within their partially disordered lattices and their solutions, or the aqueous systems containing them, are both miscible with additional portions of aqueous liquid and capable of solubilizing considerable amounts of hydrocarbons or other nonaqueous liquids. Both the temperature and the electrolyte concentration affect the interfacial tension of a surfactant system. In general, at a given tempertaure, a given aqueous electrolyte solution of surfactant micelles exhibits a relatively low interfacial tension against a given oil and may even solubilize a minor amount of the oil. However, for practical purposes, the over-all behavior of an aqueous solution, or system containing unswollen micelles is that of a pair of immiscible oil and water phases that exhibit a reduced interfacial tension and an increased tendency toward emulsification, due to the presence of a relatively high concentration of surfactant. In contrast, when the micelles of the same surfactant are swollen by the presence of the amphiphilic molecules, in the above conditions, the over-all behavior of the aqueous solution is that an aqueous liquid having a high degree of miscibility with the oil. In a waterflooding operation with the latter solution, if a first portion of the aqueous liquid fails to displace or solubilize all of the oil it contacts, a subsequent portion will solubilize the remainder.

For convenience, the term "solubilizing solution" will be used herein to refer to an aqueous solution that (1) contains a surfactant in at least the critical concentration for micelle formation, for the ambient temperature, and (2) contains amphiphilic material of low water solubility in a concentration sufficient to swell the micelles of the surfactant. The term "low water solubility" is used herein to refer to a solubility of less than about 10 grams per 100 cc. of water at 20° C. As noted above such solubilizing solutions exhibit numerous characteristics of true solutions that are miscible with oil and water. Where a slug or a discrete body of the solubilizing solution is maintained at the front of an aqueous drive liquid having a composition different from that of the solubilizing solution and the two liquids are subsequentially displaced through an oil-bearing reservoir formation, the slug functions like a liquid piston or membrane between the immiscible phases that comprise the last-injected aqueous drive liquid and the reservoir oil. The leading edge of the solubilizing solution is miscible with the oil it contacts and the trailing edge of the solubilizing soluton is miscible with the aqueous liquid that it contacts. The capability of the solubilizing solution to retain its solubilizing properties while dissolving significantly large proportions of reservoir crudes, or additional aqueous liquid, enables the solubilizing solution to continue to so function, although both the oil and the aqueous liquid are slowly diffusing into the solubilizing solution during the slow flow of the fluids within the reservoir formation. Such a displacement drives the reservoir oil, in the form of a bank of oil, ahead of the solubilizing solution. Where fingering occurs the bypassed portions of the oil are continually being solubilized in the solubilizing solution. These properties adapt the present invention for use in reservoirs that contain a high proportion of oil, such as those in which the natural gas drive has ceased to be effective, as well as in reservoirs that have been previously depleted to an oil residual in the order of 30 percent or less of their pore volumes.

In practicing the present invention, the solubilizing solution can be preformed at a surface location and injected into the reservoir formation ahead of, or as the frontal portion of, an aqueous drive fluid that is injected into the reservoir. In some situations it is advantageous to inject the solubilizing solution in a volume sufficient for it to comprise the entire aqueous drive fluid. In other situations it is advantageous to inject the solubilizing solution in a volume that is less than the pore volume between the points of injection and production and to displace a slug comprising the solubilizing solution through the reservoir by a subsequent injection of a different aqueous liquid. Alternatively, one or more of the components of the solubilizing mixture can be introduced into the reservoir ahead of the remaining components, and ahead of any subsequently injected aqueous drive liquid, so that the components become mixed, within the reservoir formation, to form the solubilizing solution in situ. In such an in situ formation of a slug of a solubilizing solution, the first injected fluid may comprise a slug comprising cresol and/or fatty acid in an oil soluble liquid form and it may be followed by a slug of aqueous liquid containing sufficient surfactant to form an aqueous liquid containing surfactant in the CMC proportions when it mixes with the first injected fluid.

In accordance with the process of this invention the solubilizing solution is formed by mixing (1) substantially any aqueous liquid comprising water or a water solution of one or more inorganic solutes that remain soluble when the solution is contacted by the components of the reservoir formation, (2) substantially any surface active material comprising a cationic, nonionic or anionic material having the properties that normally characterize a surfactant, and (3) an amphiphilic coupling agent comprising a polar organic material having a low water solubility.

Suitable aqueous liquids include: water; water solutions of alkali metal hydroxides, such as sodium hydroxide, potassium hydroxide, etc.; water solutions of salts such as sodium carbonate, sodium chloride, sodium bisulfate, etc.; and mixtures thereof. The pH of the aqueous liquid is preferably adjusted to one that is compatible with both an active form of the surfactant and the materials that will be encountered during the passage of the liquid through the reservoir formation.

Suitable surfactants include: the soaps of fatty acids, such as oleic, linoleic, hydroxy steric, etc.; the soaps of mixed organic acids, such as the tall oil fatty acids, tall oil pitch, rosin acids, the petroleum naphthenic acids, the soybean oil fatty acids, etc.; the surface active organic sulfonates and sulfonic acid salts, the nonionic and cationic surface active materials, and the like, e.g., surface-active materials such as those described under the classification of detergent compounds in Industrial Detergency by William W. Niven, Jr., Reinhold Publishing Co., New York, 1955. In forming the present solubilizing solutions, the selection of the concentration at which the surfactant is dissolved in the aqueous liquid is preferably based on the CMC proportions for such a system at the temperature of the reservoir formation. The surfactant concentration is preferably at least equal to the CMC proportions and may exceed them to the extent that is economically advantageous. In general, increasing the proportion of surfactant increases the oil solubilizing capacity, the viscosity and the cost of the solubilizing solution.

Suitable amphiphilic coupling agents include: the higher molecular weight, monohydroxy aliphatic and alicyclic alcohols, such as those containing six or more carbon atoms; the aromatic hydroxylic compounds such as the phenols, cresols, etc.; the pine oils; the sterols; cholesterols; bile salts; fatty acids containing six or more carbon atoms; amines or esters of low water solubility; etc. In forming the present solubilizing solutions, the selection of the concentration at which the amphiphile is dissolved in the surfactant micelles is preferably based on the amount required to saturate the solution, or combination, capabilities of the surfactant micelles at the temperature of the reservoir formation. This can be determined by maintaining a portion of the aqueous liquid solution of the surfactant micelles at the temperature of the reservoir formation and adding portions of the amphiphile until the addition of an additional portion causes the solution to remain turbid. The amphiphile concentration is preferably one lying between the proportion of the amphiphile that is required to saturate the aqueous liquid and the proportion that is required to saturate the micelles. For example, cresol (used herein to refer to a cresol such as ortho-cresol which may contain minor amounts of the meta- or para-cresols), which has a water solubility of about 3 percent by weight at 40° C. (the solubility of o-cresol), exhibits the following solubility in water solutions of sodium oleate:

| Sodium oleate, percent by weight | Cresol solubility, percent by volume | |
|---|---|---|
| | 25° C. | 70° C. |
| 5 | 9 | 13 |
| 10 | 13 | 29 |

Thus, the concentration of cresol in a solubilizing solution containing 5 percent sodium oleate should be between about 3 and 30 percent by volume for use in a reservoir having a temperature of 158° F. (70° C.). In general, using a relatively high proportion of the amphiphile is advantageous since it increases the oil solubilizing capability of the solubilizing solution.

Unique and particularly advantageous solubilizing solutions for use in the present process comprise aqueous liquid solutions or systems containing "acid-soap" in which the swollen surfactant micelles are fatty acid soap micelles containing fatty acid amphiphilic molecules of low water solubility. "Acid-soap" has been variously described as a chemical complex of soap and fatty acid, as an adsorption complex of soap adsorbed on droplets of fatty acids, etc. An aqueous solution of "acid-soap" comprises a solubilizing solution when the amount of soap it contains exceeds the CMC concentration for the soap in the aqueous liquid at the temperature of the reservoir formation. In such a solution the acid contained in the "acid-soap" comprises the amphiphilic coupling agent. The "acid-soap" solubilizing solutions can be formed from individual fatty acids, mixtures of fatty acids, or mixtures of the naturally occuring fatty acids along with their naturally occurring impurities. They can be formed by (1) dissolving the acid in an aqueous liquid containing enough alkali to only partially neutralize the acid, (2) dissolving the soap in an aqueous liquid and adding fatty acid, (3) similarly dissolving the soap and adding enough inorganic acid to only partially neutralize the soap, or (4) similarly dissolving a mixture of the fatty acid and the soap. Examples of particularly advantageous "acid-soap" solubilizing solutions comprise those derived: from partially neutralized tall oil pitch, such as Acintol–P (available from the Arizona Chemical Company) or Unitol–DP (available from the Union Bag Camp Paper Company); from partially neutralized petroleum acids such as the naphthenic acids; from partially neutralized vegetable oil acids such as the soybean oil fatty acids or soy soap stock, etc. The "acid-soap" solubilizing solutions contain 1:1 molecular complexes of fatty acid and soap. These complexes exhibit a high degree of oil solubility (relative to the soaps of the same acids). The tendencies of these complexes to dissolve in oil that is being displaced by an "acid-soap" solubilizing solution materially reduces the interfacial tension between the oil phase and any immiscible aqueous or solid phases that are contacted by the oil phase within the reservoir formation.

Particularly in respect to the "acid-soap" solubilizing solutions, the pH and the electrolyte concentration of the aqueous liquid should be varied in accordance with the type and concentration of the soap. The extent to which the fatty acid can be neutralized to form soap may vary from about 30 percent to about 80 percent, and in such solubilizing solutions, the electrolyte content of the aqueous liquid may vary from about 0.5 percent to about 4 percent. In general, the tolerance for neutral electrolyte increases with increases in the pH of the aqueous liquid.

The adaptability of the present solubilizing solutions to form aqueous liquid solutions of moderate alkalinity, e.g., having a pH in the order of 7–9, is particularly advantageous in respect to the waterflooding of reservoirs in which a conventional waterflood tends to finger through the oil. A wide variety of materials for increasing the viscosity of aqueous liquids are known, for example, starch, carboxyl methylated cellulose, the acrylate and other types of polymers of controlled chain length, etc. However, the aqueous solutions containing such viscosity increasers tend to become unstable when their pH is high. Slugs of, for example, the present "acid-soap" solubilizing solutions, can readily be formed at a pH at which such viscosity increasers are stable. Thus, slugs of the present solubilizing solutions can advantageously be displaced by aqueous liquids containing sufficient viscosity increases to materially reduce the tendency of the aqueous drive liquid to finger through the slug.

*Example 1.—Fractional extraction by solubilizing solutions*

A solubilizing solution was prepared in the form of a water solution containing 5 percent by weight sodium oleate and 10 percent by volume cresol. The feasibility of displacing this solution through an oil-containing reservoir formation in a manner such that it extracts most of the oil by solubilizing was demonstrated by waterflooding a sandpack maintained at 70° C. The solution was injected at a rate of one foot per day into a sand containing Ventura crude oil at a residual saturation (after waterflood) of 40.4 percent pore volume. A small amount of the oil was displaced as a bank ahead of the solubilizing solution and a total of about 91 percent of the oil was extracted in solubilized form by flowing 6 pore volumes of the solubilizing solution through the sand, leaving an organic residue of 3.5 percent pore volume.

The oil fractionation that occurred during the extraction by the above solution was further investigated. The same solution was flowed at about 1 cm. per hour over a drop of the Ventura crude oil on a microscope stage maintained at 25° C. The size of the oil drop was continually reduced by a miscible process of solubilization and its rigidity was increased until only a ragged shell remained.

In addition, the 3.5 pore volume of residue that remained in the above waterflooding test was analyzed. It proved to be a semisolid material, having an average molecular weight of 640, whereas the Ventura crude is a liquid having an average molecular weight of 290. In addition, the asphaltene content of the residue was 40 percent, while that of Ventura crude is only 7 percent.

The light ends and the aromatic components of crude oils are comprised of materials that are most readily solubilized and are the most valuable components of the crude oils. The present type of solubilizing solutions can be designed to effect a selective extraction of such components by selecting the types and concentrations of the surfactants, amphiphilic coupling agents and electrolytes that are used. The so extracted components of crude oils can be recovered, for example, by adjusting the pH of the recovered solubilizing solution to effect a separation between an aqueous phase and an oil phase containing the hydrocarbon components and, for example, the fatty acid and phenolic compounds of the solubilizing solution. The components of this oil phase can then be separated by convention qualitative organic separation procedures.

*Example II.—The effect of the amphiphilic coupling agent*

Sodium oleate is a relatively water soluble surfactant soap capable of forming solutions containing above about 10 percent by weight in an aqueous liquid. Water, sodium hydroxide and oleic acid were mixed in proportions at which they form an aqueous solution that contains 2 percent by weight of sodium oleate in the presence of unreacted sodium hydroxide. This surfactant concentration exceeds the CMC concentration and the solution comprises a solution of unswollen sodium oleate micelles. The sodium hydroxide concentration was selected to provide 180 mg. of sodium hydroxide per gram of oleic acid (where the stiochemetric equivalent is only 143), ensuring that all of the oleic acid was present in the form of its soap. This solution exemplifies an aqueous liquid solution of unswollen sodium oleate micelles.

An analogous solution was prepared so that it contained the same amount of oleic acid and only 100 mg. of sodium hydroxide per gram of oleic acid. In this solution, some of the oleic acid remained in acid form. This solution exemplifies an "acid-soap" solubilizing solution of the present invention.

Two sandpacks were prepared to typify reservoir formations having a permeability of 4 darcies and containing the amounts of Benton crude that remain after such formations have been subjected to conventional waterflooding operations. The residual oil in one pack, having a residual oil saturation of 29 percent of its pore volume, was waterflooded at a temperature of 70° C. at an injection rate of 1 foot per day, with 5 pore volumes of the above solution of unswollen sodium oleate micelles. This produced a final residual oil saturation of 28.5 percent. The residual oil in the other pack, having a water-residual oil saturation of 33 percent of its pore volume, was similarly waterflooded with only 3 pore volumes of the above "acid-soap" solubilizing solution. This produced a final residual oil saturation of only 1 percent.

It will be noted that when the micelles of the surfactant were swollen by combination with the amphiphile, about 94 percent of the oil was recovered, whereas when the micelles of the same surfactant were not swollen, less than 2 percent of the oil was recovered, even after contacting the sand with two additional pore volumes of the solution.

*Example III.—Tall oil pitch "acid-soap" solubilizing solution*

A low cost "acid-soap" solubilizing solution was prepared in the form of a water solution of 10 percent by weight tall oil pitch, 0.2 percent by weight of sodium hydroxide, and 0.8 percent by weight sodium chloride. This amount of sodium hydroxide is 20 milligrams per gram of pitch (which has an acid number that is equivalent to 25.7 milligrams NaOH per gram of pitch) so that only about 78 percent of its fatty acids were converted to soap. The oil displacing capability of this solution was tested by waterflooding a sandpack that had a permeability of 4 darcies, was maintained at 70° C., and contained 24 percent pore volume residual oil saturation of Dune Ridge crude oil. One pore volume of this solubilizing solution, followed by one pore volume of water, was injected into the sand at a rate of 0.5 feet per day. The flow of the one pore volume of the solubilizing solution through the sand displaced 86 percent of the oil in bulk form, as a bank driven ahead of the solubilizing solution. When the solubilizing solution was displaced out of the sand, by injecting one pore volume of tap water, the hydrocarbon content of the sand was reduced to zero. This extremely efficient displacement appears to be due to the synergistic effect of the various polar organic materials that naturally occur in tall oil pitch (e.g., sterols, higher molecular weight alcohols, phenolic materials, esters, etc., which are all capable of acting as amphiphilic coupling agents).

*Example IV.—Solubilizing soluiton slug drive and effect of viscosity increases*

A tall oil pitch, "acid-soap" solubilizing solution, was prepared in the form of a water solution of 20 percent by weight of partially neutralized tall oil pitch and 0.8 percent by weight sodium chloride. The amount of sodium hydroxide contained in this solution was 20 milligrams per gram of the tall oil pitch.

On test of the effects of injecting a slug of this solution ahead of a dissimilar aqueous liquid was made by injecting a slug amounting to 20 percent of the pore volume of a sandpack that had a permeability of 4 darcies, was maintained at 70° C., and contained a 28 percent pore volume residual saturation of Benton crude oil. The slug was displaced through the sand, ahead of tap water, at a rate of 1 foot per day. Severe fingering occurred and the final oil saturation was reduced only to 9 percent of the sand pore volume.

The above test was repeated using as the slug displacing fluid a water solution of carboxyl methylated cellulose (CMC–7H available from Hercules Powder Company), having a viscosity of 9.5 cp. at 70° C. In this test, the amount of fingering was materially less and the oil saturation was reduced to 3 percent of the sand pore volume.

*Example V.—Heavy oil recovery*

A solubilizing solution was prepared in the form of a water solution containing 5 percent by weight sodium oleate, 8 percent by volume cresol, and 2 percent by volume toluene. The toluene amounts to an oil-phase diluent or impurity that may be present, without adverse affect, in either the surfactant or the amphiphilic coupling agent used in the present process. The oil removing capability of this solution was tested in respect to Coalinga crude oil, which has a viscosity at 25° C. of 6000 cp., and a viscosity at 70° C. of 20 cp. The solubilizing solution was forced to flow through a sandpack that had a permeability of 4 darcies, was maintained at 70° C., and contained a 25 percent pore volume water-residual oil saturation of the Coalinga crude oil. In this test, a considerable fraction of the oil was displaced as a bank ahead of the solubilizing solution and a total of 94.4 percent of the oil was recovered by flowing 7 pore volumes of the solubilizing solution through the sand.

As indicated by the above examples, an oil-solubilizing aqueous solution of surfactant micelles that are combined with molecules of an amphiphilic organic material having a low water solubility, exhibits properties that are uniquely advantageous in a fluid that is brought into contact with a crude oil; particularly where the surfactant comprises the soap of a carboxylic acid. Such solubilizing solutions can be prepared so that they have a selected pH within a range extending from moderately alkaline to strongly alkaline and/or a selected electrolyte concentration within a range extending from very dilute to highly concentrated. For solubilizing solutions of moderate alkalinity, e.g., having a pH between about 7 to 9, the amphiphilic coupling agent can advantageously comprise a fatty acid (which would be converted to a soap in a high pH) and for solutions having a relatively high pH, the amphiphilic coupling agent can advantageously comprise a monohydroxylic aromatic compound such as a cresol.

Where it is desirable to displace oil as efficiently as possible from one region to another within a reservoir formation, the solubilizing solution can be designed to displace the oil as a bank pushed ahead of the solubilizing solution. The oil which is so displaced into a production well can be readied for marketing with little, if any, treatments other than those normally applied to the crude oil produced from a well flowing in response to a natural drive. In addition, some oil is transported in a solubilized and/or emulsified form; and, as discussed above, the portion which is so transported can be controlled by controlling the proportion of the surfactant, coupling agent and electrolyte components of the solubilizing solution. The oil that is transported in solubilized and/or emulsified form can be released by recovering the transporting solubilizing solution and adjusting its pH, electrolyte concentration, and/or temperature, to one resulting in the separation of substantially immiscible oil and water phases. Where the surfactant is a soap, and particularly where the solubilizing solution is an "acid-soap" solubilizing solution, this can readily be accomplished by adding a relatively small amount of strong acid to free the fatty acid. The lighter oil phase can be isolated from the water phase, for example, by decantation and, where desirable, the fatty acid can be recovered by extraction with aqueous alkali and reused in a reconstituted solubilizing solution.

As indicated above, where it is desirable to selectively extract the most readily solubilized components of a crude oil, the present solubilizing solutions can be flowed into and out of contact with the oil, either within a reservoir formation or within any suitable apparatus for extracting one liquid with another, ad subsequently separated, as described above, in order to isolate the components extracted from the crude oil.

I claim as my invention:

1. In an oil-producing process in which the oil in an oil-containing reservoir formation is displaced by injecting an aqueous drive liquid into the reservoir formation, the improvement which comprises injecting an aqueous solution that contains a surfactant in a concentration that exceeds the critical concentration for micelle formation and contains enough amphiphilic polar organic material of low water solubility to swell the surfactant micelles and cause said aqueous solution of surfactant to be capable of solubilizing a significant proportion of oil, with said aqueous solution of surfactant being present in at least the frontal portion of said aqueous drive liquid.

2. The process of claim 1 in which the injected aqueous solution also contains a viscosity increasing agent.

3. The process of claim 1 in which a slug of an aqueous fluid containing a viscosity increasing agent is injected into the formation prior to the injection of the aqueous drive liquid so as to reduce the tendency of the aqueous drive liquid to finger through the aqueous solution.

4. The process of claim 1 in which the surfactant of groups (1) and (2) consists essentially of a surface active alkali metal soap.

5. The process of claim 1 in which the amphiphilic polar organic material in groups (1) and (2) consists essentially of a fatty acid containing at least six carbon atoms.

6. The process of claim 1 in which the amphiphilic polar organic material of group (2) consists essentially of a monohydric aromatic compound.

7. The process of claim 1 in which the amphiphilic polar organic material of group (2) consists essentially of a cresol.

8. The process of claim 1 in which the surfactant micelle-amphiphilic polar organic compound (1) is a particularly neutralized tall oil pitch soap.

9. The process of claim 1 wherein the amphiphilic polar organic material has a solubility of less than about 10 grams per 100 cc. of water at 20° C.

10. The process of claim 1 in which water is injected into the reservoir formation following the injection of the aqueous drive liquid composition.

11. The process of claim 10 in which the water contains a water-soluble inorganic compound.

12. The process of claim 11 wherein the inorganic compound is selected from the group consisting of alkali metal hydroxide, alkali metal chloride, alkali metal carbonate, alkali metal bisulfate and mixtures thereof.

References Cited

UNITED STATES PATENTS

| | | | |
|---|---|---|---|
| 3,074,481 | 1/1963 | Habermann | 166—9 |
| 3,076,504 | 2/1963 | Meadors et al. | 166—9 |
| 3,116,791 | 7/1964 | Sandiford | 166—9 |
| 3,127,345 | 3/1964 | Groote et al. | 166—9 |
| 3,131,759 | 5/1964 | Slusser et al. | 166—42 |
| 3,170,514 | 2/1965 | Harvey et al. | 166—9 |

CHARLES E. O'CONNELL, *Primary Examiner.*

J. A. LEPPINK, *Assistant Examiner.*